(12) United States Patent
Cepulis et al.

(10) Patent No.: US 9,354,678 B2
(45) Date of Patent: May 31, 2016

(54) ENCLOSURE AIRFLOW CONTROLLER

(75) Inventors: Darren J. Cepulis, Houston, TX (US);
Yasir Q. Hashmany, Houston, TX (US);
Chanh V. Hua, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 909 days.

(21) Appl. No.: 13/384,666

(22) PCT Filed: Aug. 11, 2009

(86) PCT No.: PCT/US2009/053389
§ 371 (c)(1),
(2), (4) Date: Jan. 18, 2012

(87) PCT Pub. No.: WO2011/019337
PCT Pub. Date: Feb. 17, 2011

(65) Prior Publication Data
US 2012/0123597 A1 May 17, 2012

(51) Int. Cl.
*G05D 7/00* (2006.01)
*G06F 1/20* (2006.01)

(52) U.S. Cl.
CPC ...................................... *G06F 1/206* (2013.01)

(58) Field of Classification Search
None
See application file for complete search history.

(56) References Cited

U.S. PATENT DOCUMENTS

| | | | |
|---|---|---|---|
| 5,777,897 A | 7/1998 | Giorgio | |
| 5,963,887 A * | 10/1999 | Giorgio | ............................ 702/64 |
| 6,101,459 A | 8/2000 | Tavallaei et al. | |
| 6,188,189 B1 * | 2/2001 | Blake | ............................ 318/471 |
| 6,268,664 B1 | 7/2001 | Rolls et al. | |
| 6,470,289 B1 * | 10/2002 | Peters et al. | ................... 702/132 |
| 6,826,456 B1 | 11/2004 | Irving et al. | |
| 8,578,391 B2 * | 11/2013 | Kentaroh | ................ G06F 1/206 713/300 |
| 9,047,415 B2 * | 6/2015 | Priel | ...................... G06F 1/3203 |
| 2003/0214781 A1 * | 11/2003 | Kolb et al. | ..................... 361/687 |
| 2005/0165586 A1 | 7/2005 | Moore | |
| 2005/0231912 A1 * | 10/2005 | Arai | ........................ G06F 1/206 361/695 |
| 2007/0067657 A1 | 3/2007 | Ranganathan | |
| 2007/0150425 A1 | 6/2007 | Bryant | |

(Continued)

FOREIGN PATENT DOCUMENTS

WO   WO-2008085339 A1   7/2008

OTHER PUBLICATIONS

Chinese. Search Report cited in Appl. No. 200980160899.0 dated Aug. 12, 2013; 2 pages.

(Continued)

*Primary Examiner* — Robert Fennema
*Assistant Examiner* — Md N Mia
(74) *Attorney, Agent, or Firm* — Conley Rose, P.C.

(57) ABSTRACT

A system and method for controlling airflow in a computer system enclosure are described herein. A computer system includes an enclosure and an airflow controller. The enclosure is configured to contain a plurality of compute nodes. The airflow controller configured to control a flow of air provided to each of the plurality of compute nodes. The airflow controller is configured to receive unsolicited requests for airflow from each of the plurality of compute nodes. The airflow controller is further configured to control airflow provided to a given compute node based on the unsolicited airflow requests received from a subset of the compute nodes, including the given node. The subset of the compute nodes is assigned to a same airflow zone by the airflow controller.

15 Claims, 4 Drawing Sheets

(56) References Cited

U.S. PATENT DOCUMENTS

| | | |
|---|---|---|
| 2007/0293137 A1 | 12/2007 | Crippen et al. |
| 2008/0232974 A1 | 9/2008 | Tsuchiya |
| 2009/0277622 A1* | 11/2009 | Nair .............................. 165/246 |
| 2010/0138074 A1* | 6/2010 | Huang et al. .................. 700/300 |

OTHER PUBLICATIONS

International Search Report and Written Opinion, International Searching Authority, 11 pages, Aug. 11, 2009.

* cited by examiner

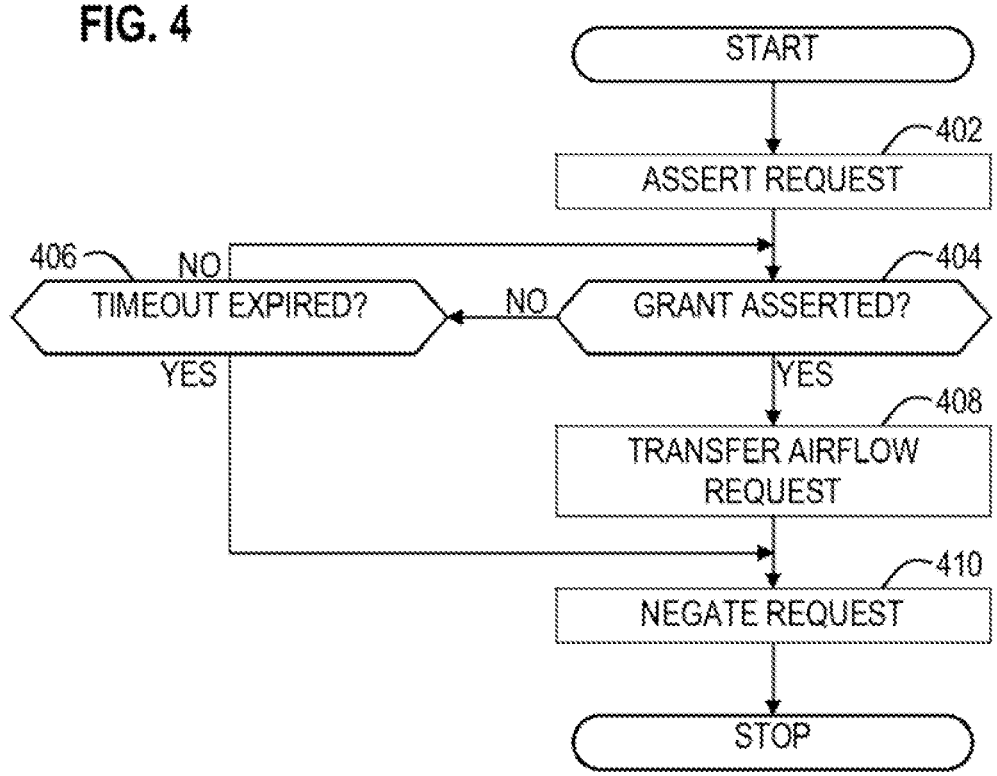

ENCLOSURE AIRFLOW CONTROLLER

BACKGROUND

Integrated circuits and other electrical devices used in computer systems generate heat during operation. Such devices are rated for operation over a specified temperature range. Operation outside of the specified temperature range can result in reduced performance, damage, or failure. Computers utilize cooling systems to maintain internal temperatures (i.e., the temperature of internal circuits) within a rated operating temperature range. Many computer cooling systems use fans to move air into and/or out of the computer enclosure, and to provide airflow across computer components. Component temperatures can vary throughout a computer, and therefore fan induced airflows used to maintain proper component operating temperatures can also vary across the computer.

BRIEF DESCRIPTION OF THE DRAWINGS

For a detailed description of exemplary embodiments of the invention, reference will now be made to the accompanying drawings in which:

FIG. 4 shows a flow diagram for a method for transferring an airflow request via the shared airflow request communication link in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Overheating of components is one cause of computer system failure. Overheating can cause intermittent temporary or permanent failures. To reduce temperature related failures, computer systems utilize fans and/or other airflow control mechanisms to draw cool air through the computer system thereby replacing air heated by computer components with cooler air and providing a better temperature gradient for transfer of heat from the components to the air. Embodiments of the present disclosure provide efficient and economical cooling of computer system components through a centralized airflow control system for an enclosure (e.g., a computer enclosure). Embodiments are configured to provide customized airflow to compute nodes housed within the enclosure based on unsolicited airflow requests provided by the compute nodes.

Figure 1:
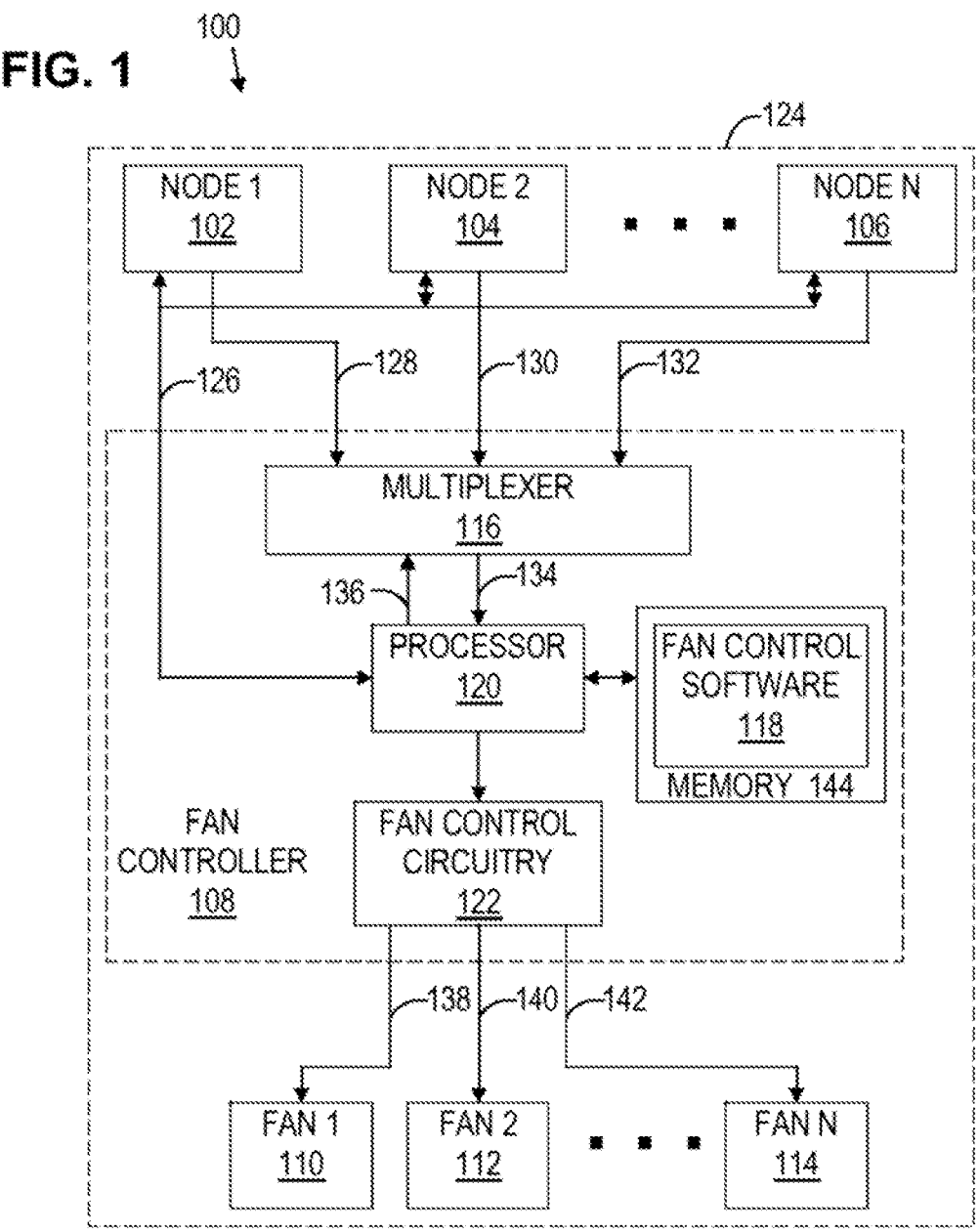
FIG. 1 shows a block diagram of a computer system including centralized airflow control in accordance with various embodiments.

FIG. 1 shows a block diagram of a computer system 100 including centralized airflow control in accordance with various embodiments. The computer system 100 includes an enclosure 124. The enclosure 124 is configured to house a plurality of compute nodes 102, 104, 106, a plurality of fans, 110, 112, 114, and a centralized airflow/fan controller 108. The enclosure 124 can also include or house other components, such as power supplies, computer system peripherals (e.g., storage, networking components, etc.) and the like.

The enclosure 124 can be a chassis configured to house one more compute nodes 102, 104, 106 (e.g., blade computers, computer mainboards, etc.), and other computer related devices. In some embodiments, the enclosure 124 allows compute nodes 102-106 to be installed and/or removed from the enclosure in accordance with the needs of the system 100 and/or a user of the system 100. Some embodiments of the enclosure 124 may be rack mountable (e.g., configured for installation is a 19 inch rack), and some embodiments may be standalone (e.g., a desktop or tower computer case).

The fans 110, 112, 114 are disposed to provide cooling airflow to the components of compute nodes 102-106 and other computer 100 components housed within the enclosure 124. In at least some embodiments, the fans 110-114 are components of the enclosure 124 (i.e., built into the enclosure), while in some embodiments, the fans 110-114 can be installed in and/or removed from the enclosure 124 as an assembly. The fans 110-114 may be disposed within the enclosure 124 and controlled to provide one or more airflow zones within the enclosure. An airflow zone refers to a distinct space within the enclosure in which the flow of air is provided by one of more fans selected and controlled by the fan controller 108 to provide airflow to the space. In some embodiments airflow zones may be defined by airflow obstructions and/or placement of fans. The airflow provided within one airflow zone may differ from the airflow provided in a different airflow zone (e.g., the air velocity may differ). Multiple compute nodes 102-106 may reside within an airflow zone. For example, at least a portion of the compute nodes 102 and 104 may be located in a first airflow zone. Moreover, a compute node may reside in multiple airflow zones. For example, a portion of compute node 102 may be located in the first airflow zone, and a different portion of the compute node 102 may be located in a second airflow zone. Thus, embodiments can provide airflow based on the cooling needs of sub-portions of the compute nodes 102-106.

The fan controller 108 is coupled to the fans 110-114 and the compute nodes 102-106. The fan controller 108 is configured to control the airflow provided to the compute nodes 102-106 via the fans 110-114 by individually controlling the speed of each of the fans 110-114. Embodiments of the fan controller 108 include fan control circuitry 112, a processor 120, memory 144 for storage of fan control software 118, and a multiplexer 116. In at least some embodiments of the computer system 100, the fan controller 108 is a component of the enclosure 124.

Each compute node 102-106, is configured to measure an operating temperature at one or more locations of the compute node, and to request a particular amount of airflow be provided to the compute node. In some compute nodes 102-106, airflow requests may be based on airflow versus temperature information stored in the compute node 102-106. In some embodiments, a compute node 102-106 can request airflow directed to a particular portion of the compute node, and thus airflow provided via an airflow zone in which the portion of the compute node is located. For example, if the compute node 102 measures an internal temperature 20 degrees above nominal at a first node location, and also measures a nominal operating temperature at a second node location, then the compute node 102 may request an increase in airflow in a first airflow zone calculated to reduce the temperature at the first location, and request no change in airflow in the airflow zone serving the second location. In at least some embodiments, the compute nodes 102-106 can detect the enclosure 124 and determine based on the detection the airflow control capabilities of the enclosure 124. Thus, based on detection of the enclosure 124, the compute nodes 102-106 provide unsolicited airflow requests to the fan controller 108.

The compute nodes 102-106 provide airflow requests to the fan controller 108 via the communication links 128, 130, 132. Embodiments of the fan controller 108 may be coupled to each compute node 102-106 by a different communication link. In some embodiments, the communication links 128-132 are serial communication links and more specifically each communication link 128-132 may be an Inter-IC ("I²C") bus.

Each compute node 102-106 may also be coupled to the fan controller 108 via a pair of grant and request signals provided for each compute node 102-106. A compute node 102 provides the communication link request signal and receives the communication link grant signal. Individual grant and request signals are collectively shown as signal group 126 in FIG. 1. The fan controller 108 uses the grant and request signals to arbitrate compute node access to the shared airflow request communication link 134. When a compute node 102 requests an airflow, the node 102 first asserts its communication link request signal. The fan controller 108 detects the request signal assertion and asserts the grant signal of the compute node 102 in response. The compute node 102 detects the asserted grant signal and transfers its airflow request to the fan controller 108.

Each of the communication links 128-132 is coupled to the multiplexer 116 of the fan controller 108. The multiplexer 116 is coupled to the processor 120. The multiplexer 116 is configured to select one of the communication links 128-132, based on selection control signals 136 provided by the processor 120. In some embodiments, the communication link request and grant signals mentioned above are coupled to the processor 120. When the processor 120 asserts the grant signal of a particular compute node (e.g., the node 102) the processor 120 also configures the multiplexer 116, via multiplexer control signals 136, to select communication link 128 to be connected to the processor 120 via link 134. In some embodiments, the link 134 is an I²C bus.

The fan controller 108 may accumulate compute node 102-106 airflow requests over a predetermined time interval. The airflow requests received during the time interval may be categorized in accordance with the airflow zones corresponding to the requested airflows. A fan speed for each fan or fans providing airflow to an airflow zone can be selected based on the requested airflows. As shown in FIG. 1, the fan controller 108 includes fan control circuitry 122 coupled to the processor 120. The processor 120 provides fan speed information to the fan control circuitry 122. The fan control circuitry provides a fan control signal 138, 140, 142 to each fan 110, 112, 114. Each fan control signal 138-142 controls the speed of the respective fan 110-114. In some embodiments, the fan control circuitry may include pulse width modulators that generate the fan control signals 138-142.

The processor 120 may be, for example, a general-purpose processor, a micro-controller, a digital signal processor, etc. The memory 144 is coupled to the processor 120. The processor retrieves from the memory 114 and executes instructions of the fan control software system 118 to provide at least some of the various airflow control functions described herein. The memory 144 (i.e., a computer readable medium) may be a semiconductor memory (e.g., random access memory ('RAM"), read-only memory ("ROM"), FLASH memory, etc.), magnetic storage, optical storage, etc. The processor 120 may also use the memory 144 for data storage. For example, airflow requests received from the compute nodes 102-106 may be stored in the memory 144 for processing.

Figure 2:
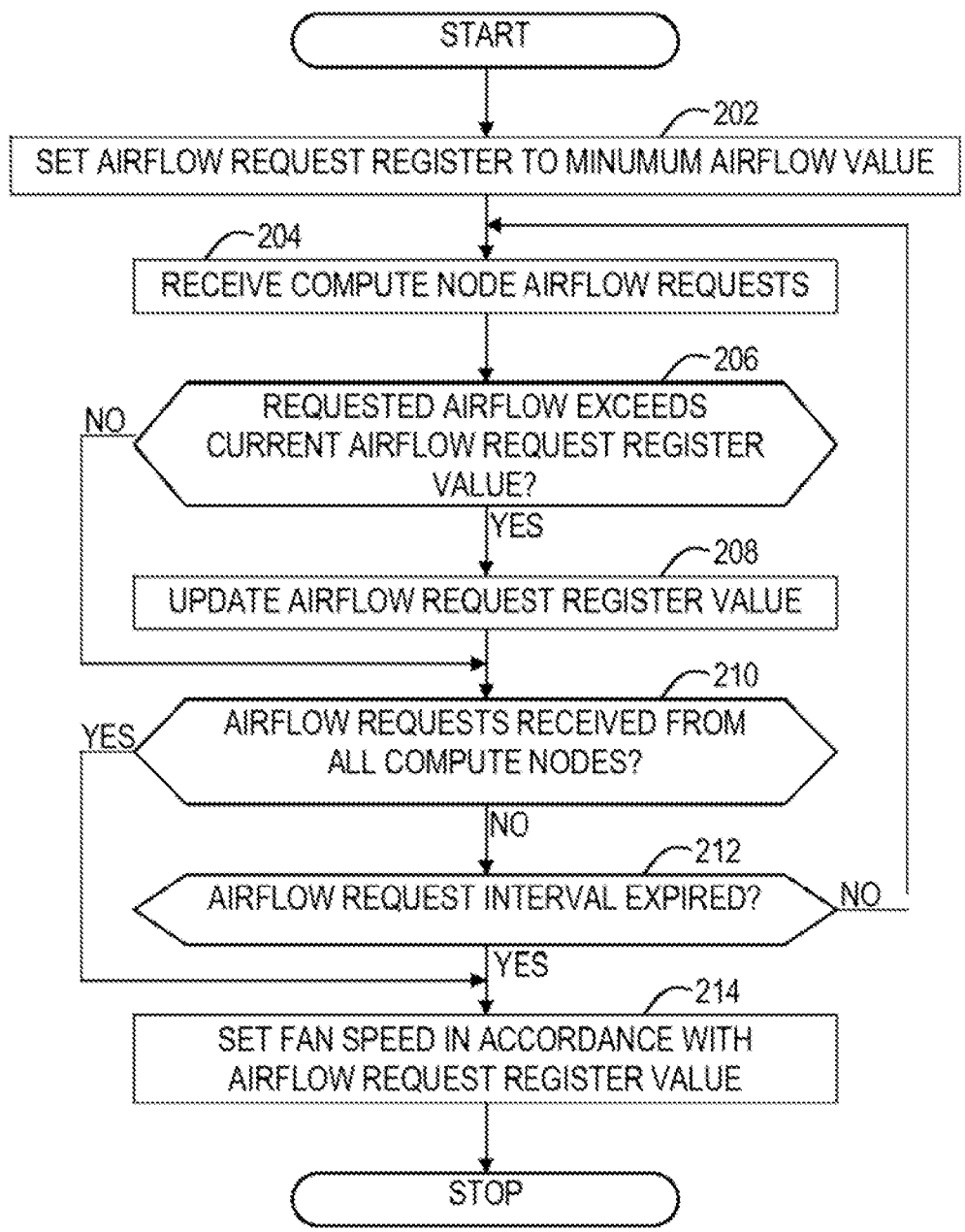
FIG. 2 shows a flow diagram for a method for computer system airflow control in accordance with various embodiments.

FIG. 2 shows a flow diagram for a method for computer system 100 airflow control in accordance with various embodiments. Though depicted sequentially as a matter of convenience, at least some of the actions shown can be performed in a different order and/or performed in parallel. Additionally, some embodiments may perform only some of the actions shown. At least some of the operations shown can be implemented as instructions provided in the fan control software 118 executed by the processor 120.

In block 202, the computer system 100 is operating and the fans 110-114 are providing airflow to the compute nodes 102-106. The fan controller 108 begins an airflow update determination by setting an airflow request register to a minimum airflow value. The airflow request register may be a storage location (e.g., a location in memory 144) where an updated airflow value is determined. In some embodiments, the minimum airflow value may correspond to a minimum speed at which the fans are turned (e.g., 20% of maximum fan speed).

In block 204, the fan controller 108 receives unsolicited airflow requests provided by the compute nodes 102-106. In some embodiments, a compute node 102 asserts a communication link request signal, responsive to which the processor 120 asserts a corresponding communication link grant signal and configures the multiplexer 116. The compute node 102 recognizes the assertion of the grant signal and transfers an airflow request to the fan controller 108.

In block 206, the processor 120 determines whether a received airflow request categorized for a particular airflow zone or fan 110-114 related to the particular airflow zone exceeds the value currently stored in the corresponding airflow request register. If the received airflow value is greater than the value stored in the corresponding airflow request register (indicating a request for greater airflow), then the processor 120 writes the received airflow value into the airflow request register in block 208. If the received airflow value is not greater than the value stored in the corresponding airflow request register then the airflow request register is not updated.

In block 210, the processor 120 determines whether airflow requests have been received from each compute node 102-104 for each airflow zone in which a compute node resides. If airflow requests have not been received for each compute node 102-106 and corresponding airflow zones, then the processor 120 determines, in block 212, whether the airflow request interval has expired. The airflow request interval is a time interval over which airflow update is performed. For example, in some embodiments, the fan controller 120 may update fan speeds once every five seconds, making the airflow request interval five seconds. If the processor 120 determines that the airflow request interval has not expired, then reception of compute node 102-106 airflow requests continues at block 204. The processor 120 may also check for airflow request interval expiration at block 204 while waiting for airflow requests.

If, in block 210, the processor 120 determines that airflow requests have been received from each compute node 102-106 for each pertinent airflow zone, or if, in block 212, the airflow request interval is determined to have expired, operation continues in block 214. In block 214, the processor 120 sets the speed of each of the fans 110-114 in accordance with the corresponding airflow request register value. The processor 120 may set the fan speed by transferring fan speed control values to the fan control circuitry 122.

Figure 3:
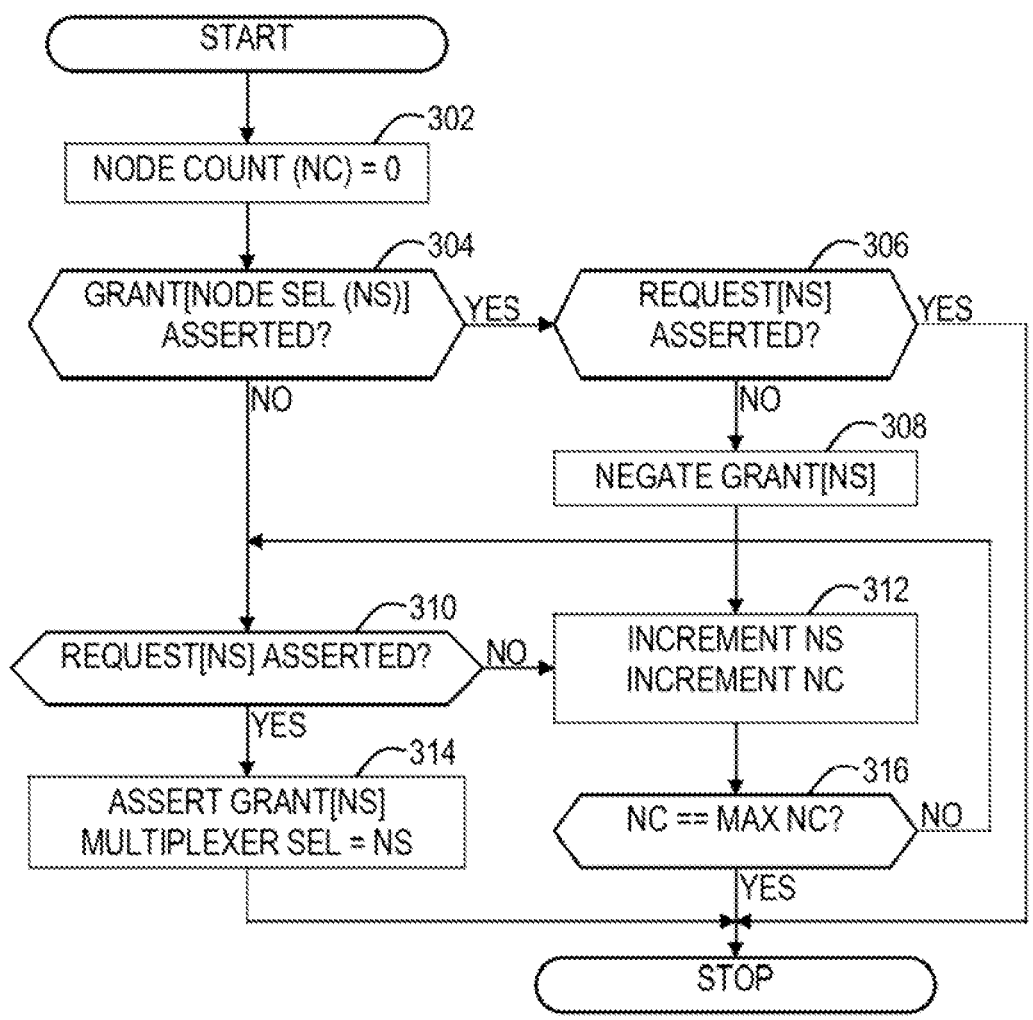
FIG. 3 shows a flow diagram for a method for receiving an airflow request via a shared airflow request communication link in accordance with various embodiments.

FIG. 3 shows a flow diagram for a method for receiving an airflow request via a shared airflow request communication link 134 in accordance with various embodiments. Though depicted sequentially as a matter of convenience, at least some of the actions shown can be performed in a different order and/or performed in parallel. Additionally, some embodiments may perform only some of the actions shown. At least some of the operations shown can be implemented as instructions provided in the fan control software 118 executed by the processor 120.

In block 302, the computer system 100 is operating and the fans 110-114 are providing airflow to the compute nodes 102-106. The fan controller 108 is receiving unsolicited airflow requests provided by the compute nodes 102-106. The fan controller 108 sets a node count (NC) variable to an initial value (e.g., zero).

In block 304, the fan controller 108 determines whether a communication link grant signal is being asserted for a selected compute node 102-106 (identified as the NODE SEL (NS) node). If a grant signal is being asserted for the selected compute node, then, in block 306, the fan controller 108 determines whether the selected compute node 102-106 is asserting a communication link request signal. If, in block 306, the selected compute node 102-106 is asserting a request signal, then the shared communication link is in use.

If, in block 306, the selected compute node 102-106 is not asserting a request signal, then a previously initiated use of the shared communication link 134 is complete, and the fan controller 108 negates the asserted grant signal in block 308.

In block 312, the fan controller 108 updates (e.g., increments) the node count and node select values (update node select selects a different compute node 102-106). In block 316, the fan controller 108 determines whether the node count has reached a predetermined termination (e.g., maximum) value. Those skilled in the art will understand that node count may be set to a maximum value in block 302, decremented in block 312 and compared to a minimum value in block 316 to achieve the desired control. If the node count is equal to the predetermined termination value, then the reception flow is complete. If, in block 316, the node count is not equal to the predetermined termination value, then operation continues in block 310.

In block 310, the fan controller 108, determines whether the compute node corresponding to node select is asserting a communication link request signal. If the node select compute node is asserting a request signal, then, in block 314, the fan controller 108 asserts the grant signal corresponding to the node select compute node and configures the multiplexer to route the communication link associated with the compute node to the processor 120 via the shared communication link 134. The selected compute node can then transfer an airflow request to the fan controller 108.

If the fan controller 108 determines in block 310 that the compute node corresponding to node select is not asserting a communication link request signal, then operations continue in block 312 where node select and node count are incremented.

FIG. 4 shows a flow diagram for a method for transferring an airflow request via the shared airflow request communication link 134 in accordance with various embodiments. Though depicted sequentially as a matter of convenience, at least some of the actions shown can be performed in a different order and/or performed in parallel. Additionally, some embodiments may perform only some of the actions shown. At least some of the operations shown can be implemented as instructions provided in software stored on the compute nodes 102 and executed by a compute node 102-106 processor.

In block 402, the computer system 100 is operating and the fans 110-114 are providing airflow to the compute nodes 102-106. A compute node (e.g., node 102) measures a temperature of a component of the compute node 102, and based on the temperature measurement generates an airflow request to provide to the fan controller 108. The compute node 102 asserts a request signal to request access to the shared airflow request communication link 134.

In block 404, the compute node 102 determines whether the fan controller 108 has transferred control of the communication link to the compute node 102 by asserting a grant signal. If a grant signal has not been asserted, then, in block 406, the compute node 102 determines whether a timer defining a maximum time during which the compute node 102 waits for assertion of a grant signal has expired. If the timer has not timed out (i.e., the time-out has not expired), then the compute node 102 continues to monitor grant assertion in block 404. If the timer has timed out (i.e., the time-out has expired), then the compute node 102 negates the request signal in block 410.

If, in block 404, the compute node 102 determines that the fan controller 108 has asserted a grant signal, thereby transferring control of the communication link 134 to the compute node 102, then the compute node 102 transfers the airflow request to the fan controller 108 via the communication link 128/134 in block 408. When the airflow request transfer is complete, the compute node 102 negates the request signal in block 410.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
an enclosure configured to contain a plurality of compute nodes;

an airflow controller configured to control a flow of air provided to each of the plurality of compute nodes;

wherein the airflow controller is configured to receive unsolicited requests for airflow from each of the compute nodes;

wherein the airflow controller is configured to control airflow provided to a given compute node based on the unsolicited airflow requests received from a subset of the compute nodes, including the given node, the subset of the compute nodes being assigned to a same airflow zone by the airflow controller; and a shared communication link coupling the plurality of compute nodes to the airflow controller, wherein the communication link includes a communication link access request signal received by the airflow controller indicating a given compute node has an airflow request, a communication link grant signal asserted by the airflow controller in response to the request signal, and a serial data link configured to propagate the unsolicited airflow requests from the plurality of compute nodes to the airflow controller.

2. The system of claim 1, wherein the enclosure comprises a plurality of fans configured to provide airflow to the plurality of compute nodes, and the airflow controller is configured to individually control each of the plurality fans based on the unsolicited airflow requests received from the plurality of compute nodes.

3. The system of claim 1, wherein the compute nodes are configured to detect the enclosure and responsive to the detection provide airflow requests to the airflow controller.

4. The system of claim 1, wherein the airflow controller is configured to adjust the flow of air provided to each of the plurality of compute nodes at a predetermined interval, the adjustment comprising providing the given compute node with a maximum airflow requested by a compute node from amongst compute nodes forming the subset of the compute nodes including the given node.

5. The system of claim 1, wherein each of the compute nodes comprises a processor to measure temperature of a component of the compute node, and generate a request for airflow based on the measured temperature.

6. The system of claim 1, further comprising a plurality of serial data links, each of the plurality of serial data links being assigned to one of the plurality of compute nodes and wherein the communication link access request signal and the communication link grant signal form a pair of signals and wherein the system further comprises a plurality of the pairs, each of the plurality of pairs being assigned to a specific one of the plurality of compute nodes.

7. A method, comprising:
receiving unsolicited airflow requests from each of a plurality of compute nodes installed in an enclosure;
categorizing each airflow request in accordance with an intra-enclosure airflow zone in which the compute node providing the airflow request is located;
controlling a fan in the enclosure to provide an airflow to a given compute node based on all of the airflow requests received during a predetermined time interval from compute nodes located in an airflow zone including the given compute node.

8. The method of claim 7, further comprising setting an airflow request register to a predetermined minimum non-zero airflow value at the start of an airflow update interval.

9. The method of claim 7, further comprising determining airflow provided to the given compute node based only on requests for airflow greater than a current airflow value.

10. The method of claim 7, further comprising determining an airflow to provide based on a maximum airflow request received from compute nodes within an airflow zone within a predetermined interval.

11. The method of claim 7, further comprising:
receiving, by an airflow controller in the enclosure, a request for control of an airflow request communication link from a given one of the plurality of compute nodes;
granting, by the airflow controller, control of the communication link to the given compute node; and
receiving, by the airflow controller an airflow request from the given compute node.

12. An airflow controller, comprising:
a processor;
a software system that when executed configures the processor to individually control an airflow provided to each of a plurality of airflow zones within an enclosure comprising the airflow controller;
wherein each airflow zone provides airflow to a plurality of compute nodes, and the software system configures the processor to receive unsolicited airflow requests from the plurality of compute nodes;
serial airflow request links, each of the serial airflow request links being assigned to one of the plurality of compute nodes, each of the serial airflow request links to propagate unsolicited airflow requests from the plurality compute nodes to the airflow controller; and
pairs of grant and request signals, each pair assigned to one of the plurality of compute nodes, wherein the airflow controller selects a single serial airflow request link from the serial airflow request links based on a request for link access to send an airflow requests received from a given compute node.

13. The airflow controller of claim 12, wherein the software system configures the processor to control a plurality of fans disposed within the enclosure, at least one of the plurality of fans providing airflow to each airflow zone.

14. The airflow controller of claim 12, wherein the software system configures the processor to select an airflow for a given airflow zone based on a maximum airflow requested by a compute node within the given airflow zone.

15. The airflow controller of claim 12, further comprising an airflow request register for each airflow zone, wherein the software system configures the processor to periodically set a given airflow request register in accordance with a minimum predetermined fan speed, to determine whether received requests exceed the airflow specified by the current value of the given airflow request register and to overwrite the airflow request register responsive to a determination that a request for airflow exceeds the airflow specified by the current value of the given airflow request register.

* * * * *